(12) United States Patent
Chou et al.

(10) Patent No.: US 7,629,751 B2
(45) Date of Patent: Dec. 8, 2009

(54) ELECTRICAL COMPENSATION AND FAULT TOLERANT STRUCTURE FOR LIGHT EMITTING DEVICE ARRAY

(76) Inventors: Chen-Jean Chou, 21 Ridgefield Rd., New City, NY (US) 10956; Chen-Shing Chou, 21 Ridgefield Rd., New City, NY (US)

(*) Notice: Subject to any disclaimer, the term of this patent is extended or adjusted under 35 U.S.C. 154(b) by 267 days.

(21) Appl. No.: 11/681,781

(22) Filed: Mar. 4, 2007

(65) Prior Publication Data

US 2007/0215854 A1  Sep. 20, 2007

Related U.S. Application Data

(60) Provisional application No. 60/767,101, filed on Mar. 3, 2006.

(51) Int. Cl.
*H05B 37/00* (2006.01)

(52) U.S. Cl. ............ 315/123; 315/121; 315/185 R (58) Field of Classification Search ............ 315/155, 315/185 R, 192, 119, 121, 123, 185 S; 362/11, 362/612, 227, 555, 800; 307/11, 36, 38
See application file for complete search history.

(56) References Cited

U.S. PATENT DOCUMENTS

| | | | | |
|---|---|---|---|---|
| 4,473,858 A | * | 9/1984 | Thiele | 361/91.8 |
| 4,780,621 A | * | 10/1988 | Bartleucci et al. | 307/11 |
| 4,887,074 A | * | 12/1989 | Simon et al. | 345/82 |
| 5,900,700 A | * | 5/1999 | Arndt et al. | 315/291 |
| 6,084,357 A | * | 7/2000 | Janning | 315/122 |
| 6,870,328 B2 | * | 3/2005 | Tanabe et al. | 315/291 |
| 2003/0015968 A1 | * | 1/2003 | Allen | 315/185 R |
| 2006/0103320 A1 | * | 5/2006 | Janning | 315/164 |
| 2006/0181828 A1 | * | 8/2006 | Sato et al. | 361/91.1 |
| 2006/0220585 A1 | * | 10/2006 | Negley et al. | 315/185 R |
| 2007/0258176 A1 | * | 11/2007 | Ball et al. | 361/56 |
| 2007/0273296 A9 | * | 11/2007 | Janning | 315/185 S |

* cited by examiner

*Primary Examiner*—David Hung Vu
*Assistant Examiner*—Tung X Le (57) ABSTRACT

Light emitting device arrays comprising alternate current routes that redirect supplied current in the event of open circuit due to a damaged light emitting element are provided. Furthermore, passive light emitting device arrays that provide current compensation for lost light output are provided.

24 Claims, 12 Drawing Sheets

ELECTRICAL COMPENSATION AND FAULT TOLERANT STRUCTURE FOR LIGHT EMITTING DEVICE ARRAY

CROSS REFERENCE TO RELATED APPLICATIONS

The present application claims priority of U.S. Provisional Patent Application No. 60/767,101, filed on Mar. 3, 2006, which is hereby incorporated by reference.

BACKGROUND OF THE INVENTION

1. Field of the Invention

The present invention relates to the circuit for operating light-emitting devices (LED) and a drive scheme to operate such. More specifically, the present invention provides a method to deliver uninterrupted drive current to the LEDs in the array at the event of damage to one or more LED elements in the array.

2. Description of the Prior Art

Light emitting diodes are attracting wide interests in display application in recent years. The applications include direct view screen constructed from organic or inorganic light emitting diodes, backlight for LCD, LED lighting and etc. Its excellent form factor, fast response time, lighter weight, low operating voltage, make it the ideal device for a wide range of applications. Such applications typical comprise a plurality of LEDs in the form of serial or array structure. Whereas the operating life for an individual LED may be acceptable, the collective life time of an LED array containing a large number of LEDs is a serious concern over the reliability of such products. This issue is particularly critical in applications where the replacement of LED unit is not practical.

Figure 1:
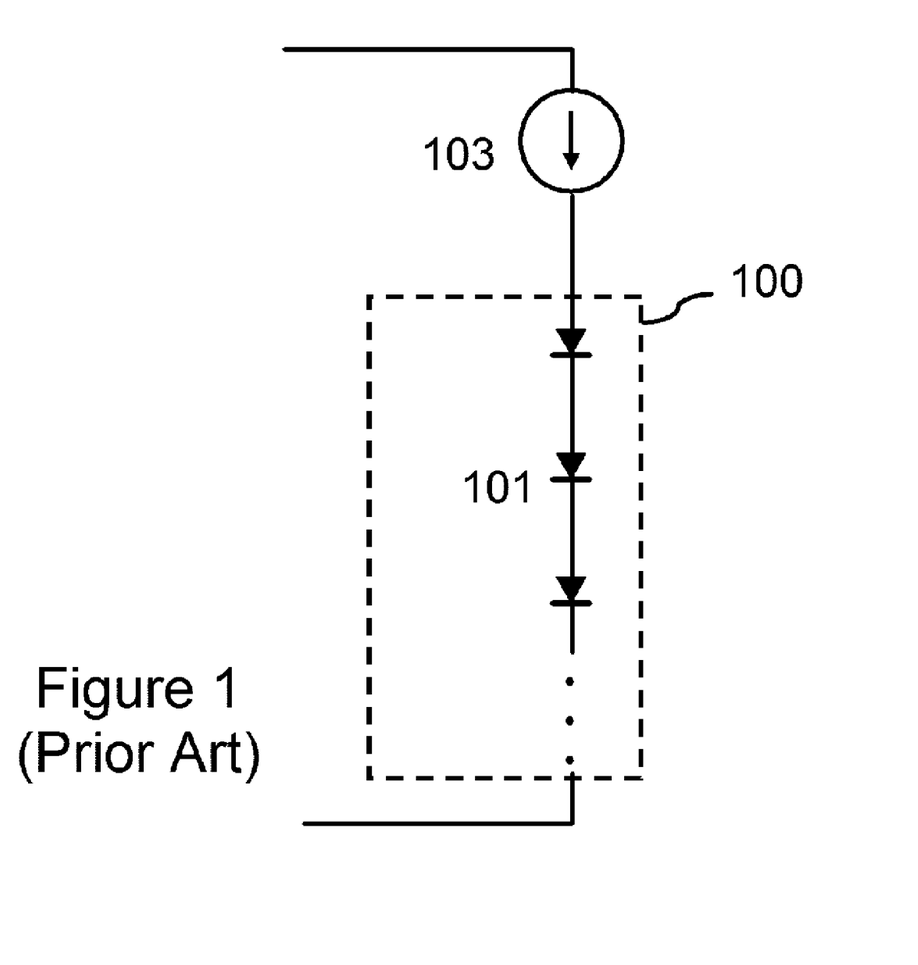
FIG. 1 is a schematic of a prior art light emitting device array.

An LED's light output is readily controlled by the drive current directed thereto. Where a multiple LEDs, each delivering similar light output, is preferred in an application, a string of LED connected in series is typically used, as provided in FIG. 1 where the LED array 100 connected in series, and a current source 103 delivering the drive current. The control of light output is through the adjustment of the current level via a control circuit according to the signals. In such serial construction, a failure of any LED in the string makes the entire string inoperable. The requirement for the reliability of LED thus increases with the number of LEDs.

SUMMARY OF THE INVENTION

The present invention provides architectures that provide alternate routes for the drive current around a damage LED in an array. Furthermore, architectures that increase current density in the LED surrounding a damage LED element are provided. Such latter architectures allow a light compensation for lost light output due to a damage LED by increasing the light output of surrounding LED light output.

Furthermore, parallel LED arrays structures are used to increase total operating life of LED array. Such structure may be implemented at a very low cost, delivering a ready improvement in operating lifetime.

DETAILED DESCRIPTION OF THE INVENTION

The present invention is directed to the structure of light emitting device array and the operation methods. Preferred embodiments are described using display apparatus as illustration.

The present invention provides self-repair schemes and circuits for a display apparatus comprising a plurality of light emitting devices. At the event of a light emitting device becoming non-operative due to damage in its electrical property, alternate conducting paths are created to maintain the operation of the rest of the light emitting devices. Furthermore, light loss of a damaged device is compensated by the increase of light output from light emitting devices adjacent to the damaged device. In this description, light emitting diode (LED) is used as preferred embodiment. For those skilled in the art, it is conceivable that a general class of light emitting devices, including those with bi-directional operation, work equally well in all embodiments presented herein.

The use of breakover voltage in this description does not limit the type of applicable device and is not restricted to a specific type of device such as diac. Such a term provides a general reference to a voltage point where a general voltage control device changes from one state to another, and maintains its convenient relation for the discussion related to a diac example.

The present invention will hereinafter be described in detail with reference to the drawings.

Figure 2:
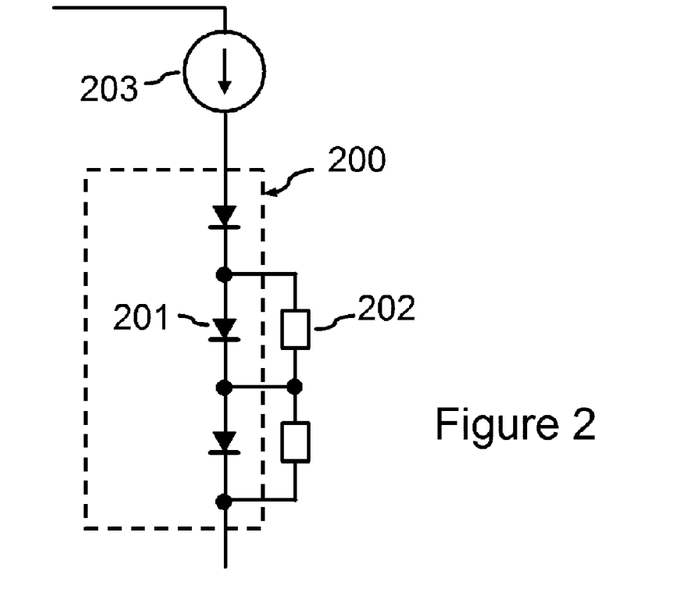
FIG. 2 is a schematic of a light emitting device array of the present invention.

FIG. 2 provides a preferred embodiment comprising a cluster 200 of light emitting diodes connected in series. The anode of a light emitting diode (LED) 201 in this cluster is connected to the cathode of the preceding light emitting diode in the series, and the cathode of the light emitting diode 201 is connected to the succeeding light emitting diode in the series. A current source driver 203 is connected to the cluster of LED to deliver a predetermined current to the light emitting diode in the cluster. A voltage control device 202 is connected to a LED 201 in parallel. The voltage control device 202 conduct no or substantially lower current than the LED 201 when the voltage control device is in its off state. Therefore, when the voltage control devices are all in the off-state, the cluster of the LED 200 operates the same manner as a string of LED without the parallel voltage control devices. The current source directs a pre-determined fixed current I to the cluster of LED, and each and every LED in the cluster conducts the same current I, thereby emits the light in the same manner according to the value of current I.

In the event when an LED 201 becomes open circuit, due to damage for example, the fixed current supplied by the current source causes the voltage across the two ends of 201 to rise as required by the continuity of current. The continuity of current also redirect the current I to the voltage control device 202, thus raising the voltage across the device 202. The voltage increase in 202 will set the device to its on-state and allowing a current I to be re-directed via 202, and continue throughout the rest of the LED cluster.

Figure 2A:
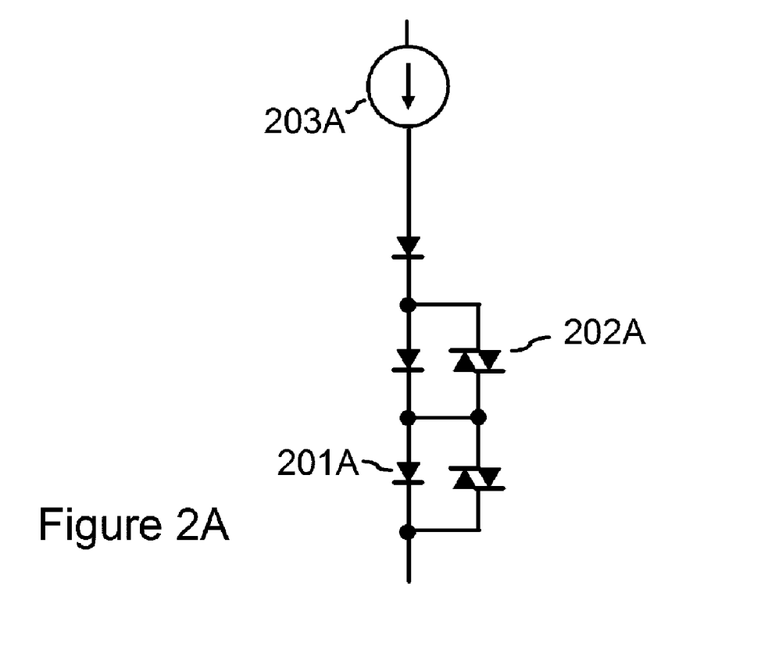
FIG. 2A is a preferred embodiment of a light emitting device array of the present invention.
Figure 3:
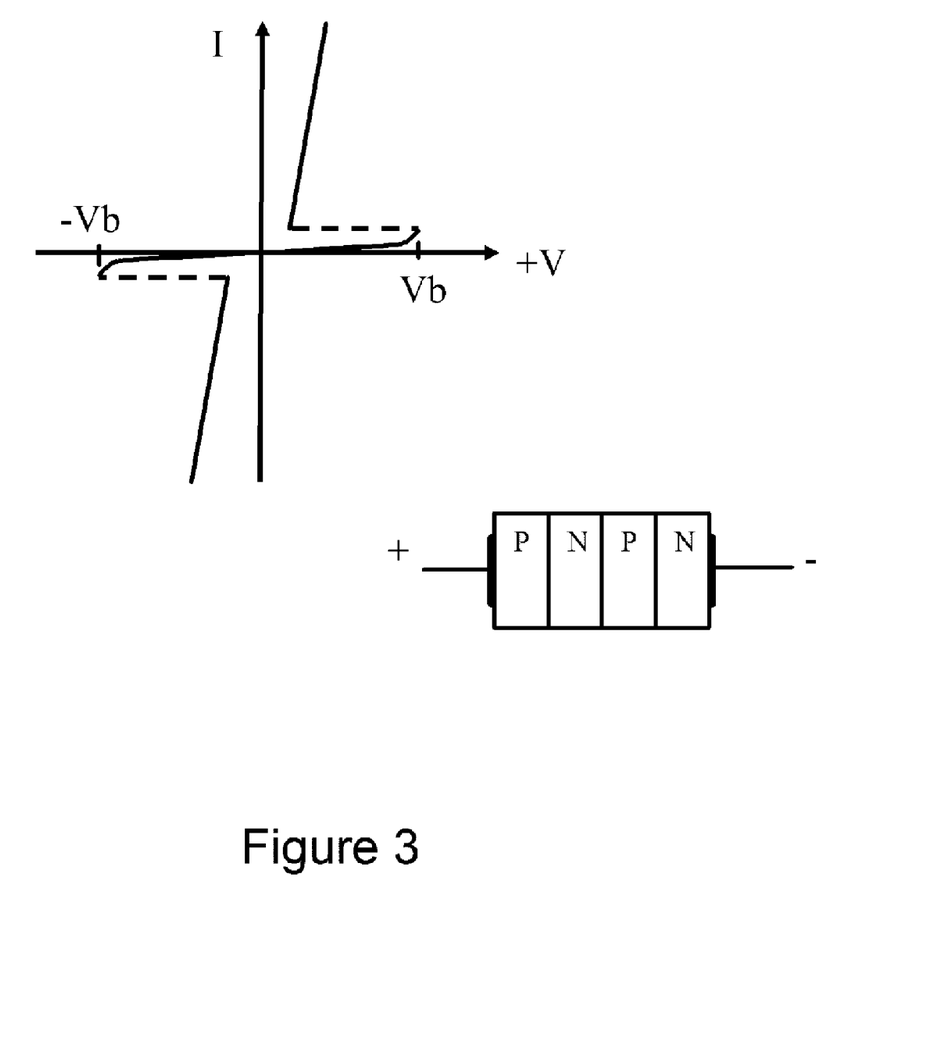
FIG. 3 is an illustration of current voltage-relation of a preferred embodiment, and an example of a preferred embodiment in the present invention.

A two-terminal diac is provided as an example of a preferred embodiment of the voltage control device in FIG. 2A. A typical diac comprises four adjacent silicon regions of different types as shown in FIG. 3. Either a p-n-p-n or an n-p-n-p gives a current voltage characteristics illustrated in FIG. 3A. Raising the voltage from zero, a diac starts in its off-state with a high intrinsic impedance. As the voltage across the two ends of a diac reaches beyond its breakover voltage Vb, a diac turns on in latch-up mode with its terminal voltage drops instantly, resulting in a much lower resistance (on-state) than its off-state. With proper selection of diac, this action allows the LED cluster to operate in fixed current mode within a voltage range comparable to that of the LED. The diac selected may be constructed to have the breakover voltage from a fractional to a few volts above the maximum LED operating voltage, so it remains in its off-state during a normal LED operation where the LED is conducting the supplied current. When an LED is damaged and becomes open circuit, the voltage across the diac rises to its breakover voltage first, and snap back to a lower voltage while the supplied current I is channeled through it, allowing the rest of the LED elements continue to function. As an example, for a typical LED operates in a range between 3.5 and 5V, a preferred implementation of a diac may be designed to have a breakover voltage between 5.5 to 9.5 volts. Such a design ensures that the diac remains off and does not divert ordinary current when the LEDs are in normal condition, while conducting at low voltage in the event that an LED becomes open circuit. Such breakover voltage may be obtained with a thin center p-n regions of FIG. 3. Reduction of Vb of a diac may be achieved by reducing the thickness of the p and n regions in a diac.

Figure 4:
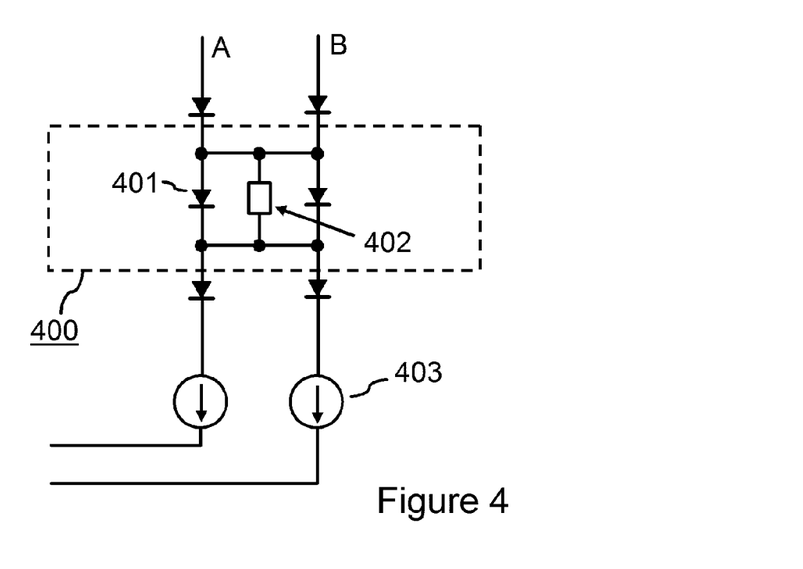
FIG. 4 is a schematic of a preferred embodiment of light emitting device array of the present invention.
Figure 4A:
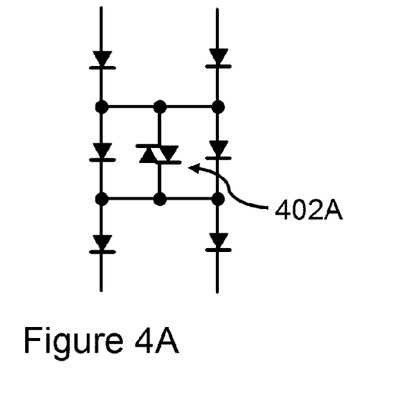
FIG. 4A is a preferred embodiment of light emitting device array structure of the present invention.
Figure 4B:
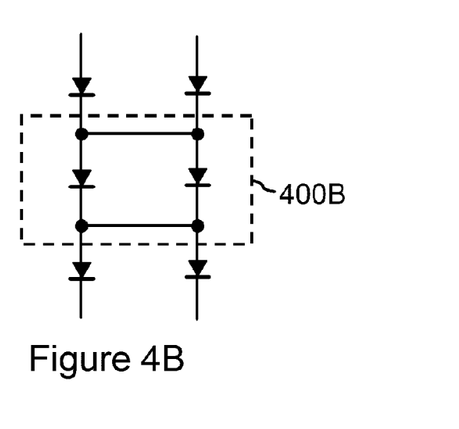
FIG. 4B is a preferred embodiment of light emitting device array structure of the present invention.

FIG. 4B illustrate a preferred embodiment of LED array structure comprising two LED clusters in parallel. In FIG. 4B, the two LED clusters are inter-connected; an LED element in the first (left) cluster is connected to an LED element of the same type in the second (right) cluster, the first end (anode) to the first end (anode), and the second end (cathode) to the second end (cathode). In the event where the left LED in 400B becomes open circuit, all the source current will be redirected to the right LED in 400B. As both LEDs are of the same type, the light output from the right LED is doubled as twice as much current is directed through it. This makes up the light loss of the left LED. The probability of both left and right LEDs become open circuit at the same time is substantially lower; it is the square of the single probability. The two clusters may be driven by two separate current sources.

FIG. 4 illustrates a preferred embodiment of an LED array with two parallel clusters, where an LED element (401) in the left cluster is connected to an LED of the same type in the right cluster, as was in FIG. 4B. Furthermore, and voltage control device 402 is connected between the anode (first end) and the second (cathode) of the LED. The voltage control device has a turn-on voltage slightly (from a fraction to a few volts) above the maximum operating voltage of the LEDs. When at least one LED remains operational, the voltage control device 402 is in its off-state and not conducting any significant current. In the event where both left and right LEDs are open circuit due to damage, the voltage control device 402 is turned on, allowing the current to be channeled through, allowing the rest of the LEDs in the array continue to function.

FIG. 4A provides a preferred embodiment of the voltage control device, wherein a diac 402A is used as the voltage control device. The current-voltage characteristics for the diac is similarly considered here as for FIG. 2A, and was discussed in the description of FIG. 3. A two terminal device with a current-voltage characteristics similar to a diac may be used to deliver the same performance.

Figure 5:
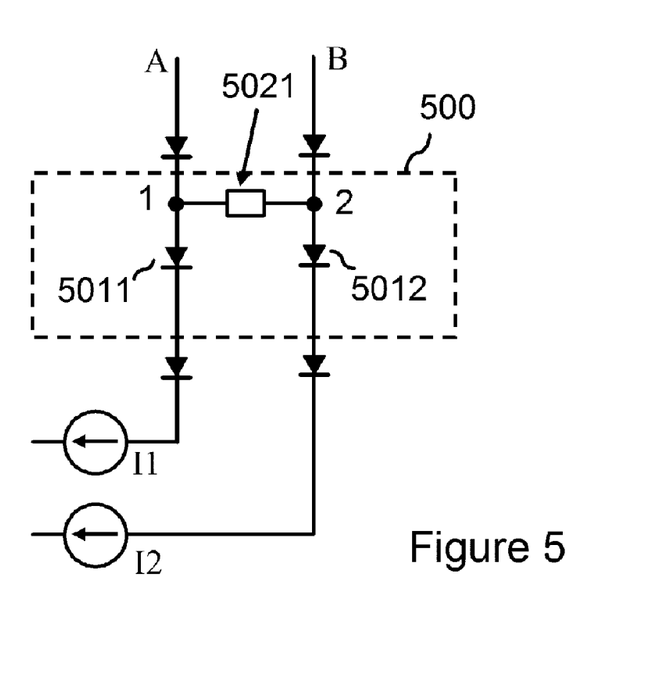
FIG. 5 is a schematic of a preferred embodiment of light emitting device array of the present invention.

FIG. 5 is a preferred embodiment wherein a voltage control device is connected to provide alternate current route via a light emitting device in an adjacent cluster of light emitting devices. The light emitting diode array in FIG. 5 comprises a first cluster A and a second cluster B of light emitting diodes. The light emitting device 5011 and 5012 are of the same type, thereby operate with the same onset voltage. A voltage control device 5021 connects the anodes of the light emitting diode 5011 and 5012. In the event any light LED in the down-stream from node 1 of cluster A becomes open, the current I1 is redirected to cluster B via voltage control device 5021.

As a preferred mode of operation, the voltage control device 5021 in Figure is constructed to have a turn-on voltage between 0.5V and said onset voltage. As an example, for a LED with 3.5V onset voltage, a preferred voltage control device is made have a turn-on voltage between 0.5V to 3.5V.

Figure 5A:
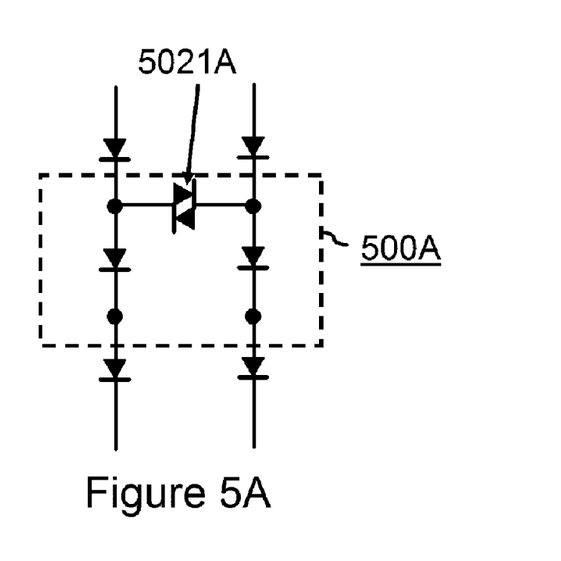
FIG. 5A is a preferred embodiment of light emitting device array of the present invention.

FIG. 5A further provides a preferred embodiment using a diac as the voltage control device. As a further preferred embodiment, the diac is made to have a breakover voltage below 7 volts. Such a low may keep the voltage drop on the diac below 4 volts after it is turned on, and thus keep the power dissipation low. A further reduction of diac breakover voltage is beneficial for better power efficiency. A minimum breakover voltage is required to maintain the normal direction of current flow. Typically one volt is a preferred minimum breakover.

Figure 6:
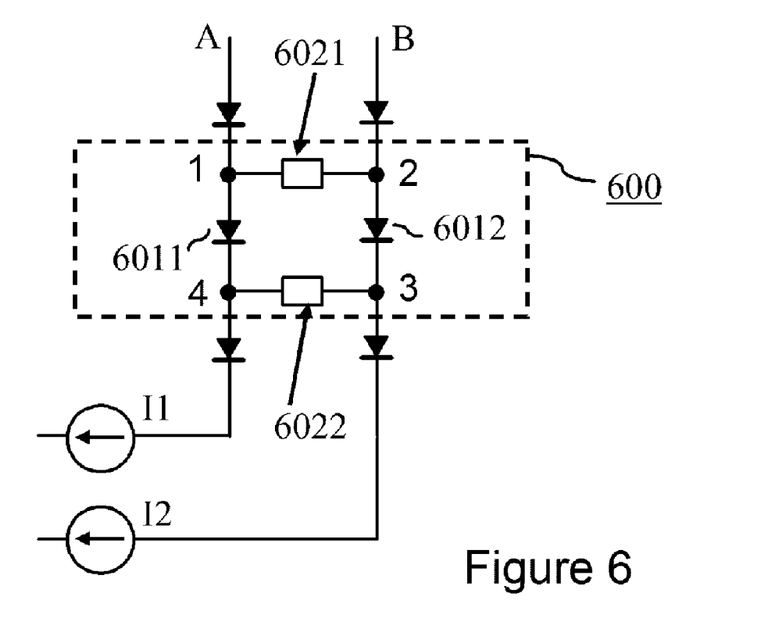
FIG. 6 is a schematic of a preferred embodiment of light emitting device array of the present invention.

A preferred embodiment of FIG. 6 further improves the device utilization of FIG. 5. In FIG. 6, a second voltage control device 6022, in addition to 6021, connects the two cathodes of the two LEDs 6011 and 6012, both are of the same type. In the event that LED 6011 becomes open circuit due to damage, the voltage at node 1 is pulled toward high-side and the voltage at node 4 toward low-side. The continuity of current requires that the current from source I1 of FIG. 6 be re-directed via voltage control device 6021 to cluster B, raising the voltage at node 1, and through LED 6012, be returned to cluster A at node 4. For a preferred operation, the voltage control device has a turn-on voltage between 0.5V to slightly higher than the onset voltage of the LEDs 6011 and 6012.

While an amount of current I1 is lost on LED 6011, the LED 6022 is now conducting a total current of (I1+I2). Since 6011 and 6012 are the same type of LEDs, and both with a similar linear relation between current and light output, the light output lost at LED 6011 is fully compensated by the increased light output of LED 6012.

Figure 6A:
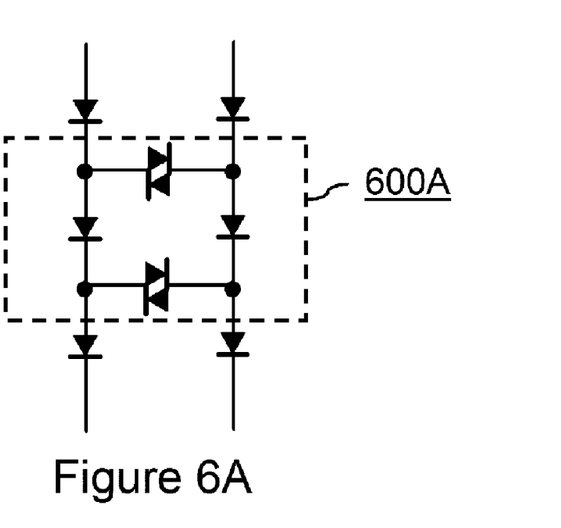
FIG. 6A is a preferred embodiment of light emitting device array of the present invention.

FIG. 6A further provides a preferred embodiment 600A using a diac as the voltage control device. As an example of a preferred operation, the diac is selected to have a breakover voltage between 0.5V and the onset voltage of LED 6011 and 6012. For example, for an LED with 3.5V onset voltage, a preferred diac for this implementation may be made to have a breakover voltage (Vb) around 5V. A lower Vb is desirable for better power efficiency. A minimum Vb is required to maintain the normal current direction when the LEDs are in normal condition. In such normal current direction, the diac remains in its off-state.

Figure 7:
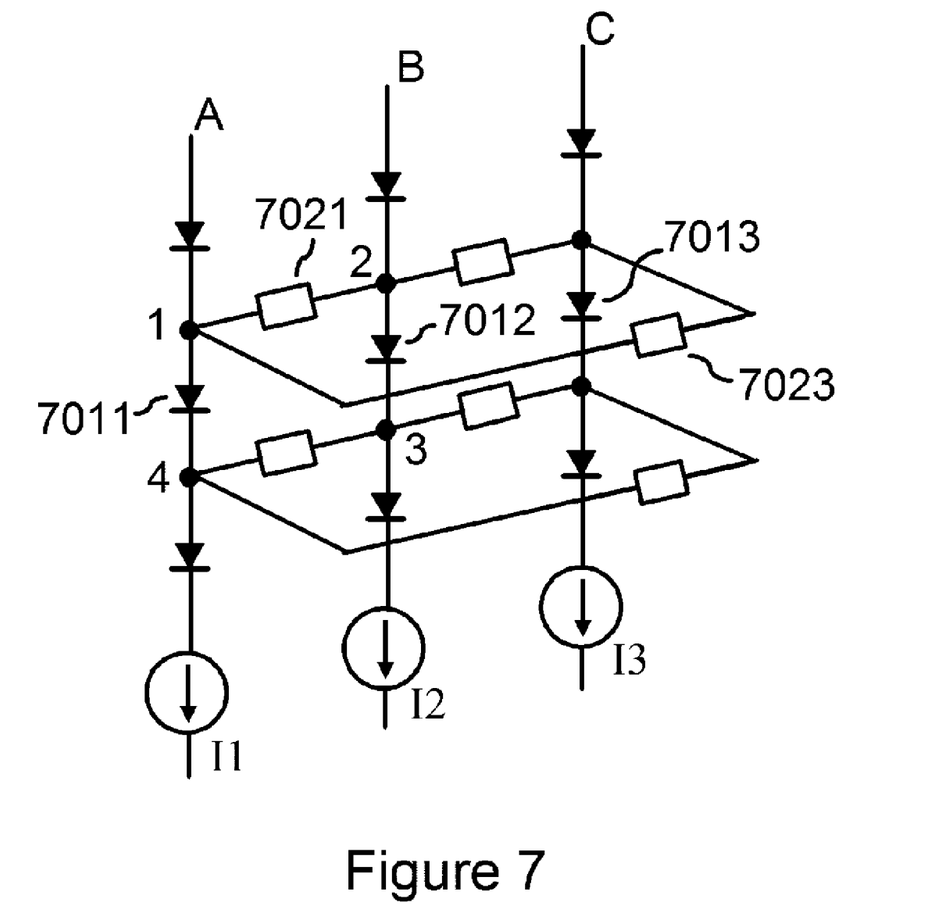
FIG. 7 is a schematic of a preferred embodiment of light emitting device array of the present invention.

FIG. 7 provides a preferred embodiment wherein three clusters A, B and C, of LEDs are included. Each cluster comprises at least an LED of the same type, LED 7011, 7012, and 7013. Each pair from these three LEDs 7011, 7012, and 7013 are connected in a similar manner as the pair of LEDs connected in FIG. 6, via a voltage control device same as 7021. The connection is depicted in FIG. 7.

With a similar analysis as for the embodiment of FIG. 6, in the event that the LED 7011 becomes open circuit, the current I1 of cluster A is re-directed in to the clusters B and cluster C via voltage control devices 7021 and 7023, respectively. Through LEDs 7012 and 7013, the diverted currents are re-directed back to cluster A at node 4, via the two voltage control devices connected to node 4. The lost light output of LED 7011 is now compensated in part by 7012, and in part by from 7013, as each conducts part of the current I1. The total current diverted to 7012 and 7013 is equal to I1. Since the LEDs 7012 and 7013 are of the same type as LED 7011, the same linear current-intensity relation applies to all three LEDs. The sum of the increased light output in LED 7012 and 7013 due to increase in current is then equal to the original light output from LED 7011 when it conducted a current I1. The lost light output of LED 7011 is thus fully compensated by the combination of the two adjacent LEDs 7012 and 7013.

In an implementation, the voltage control device (such as diac) is may be arranged in the close proximity of the LEDs, or in a package containing a number of such devices at a distance and connected to the LEDs with conductive lines.

A preferred embodiment of the voltage control device using diac may be made for the embodiment of FIG. 7 similar to that for the embodiment of FIG. 6.

Figure 8:
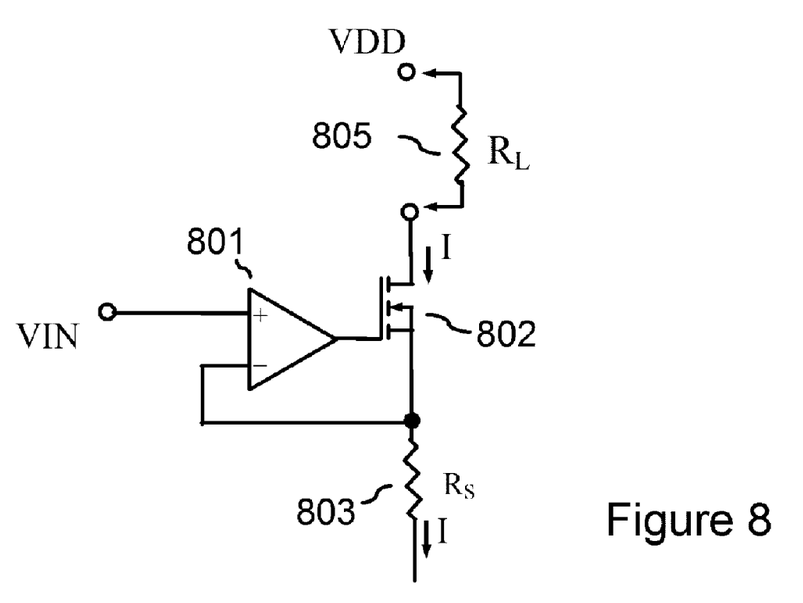
FIG. 8 is a schematic of a preferred embodiment of a current source.

In this description, current source drivers are used in the preferred embodiments. An example of a preferred embodiment of a current source for driving a cluster of LED described in this invention is provided in FIG. 8 comprising an operational amplifier 801, a DMOS 802, and a sense resistor 803, wherein the load $R_L$ represents the LED cluster. The amount of current may be controlled by an input voltage applied at VIN. Many variations of current driver are available commercially.

Figure 9:
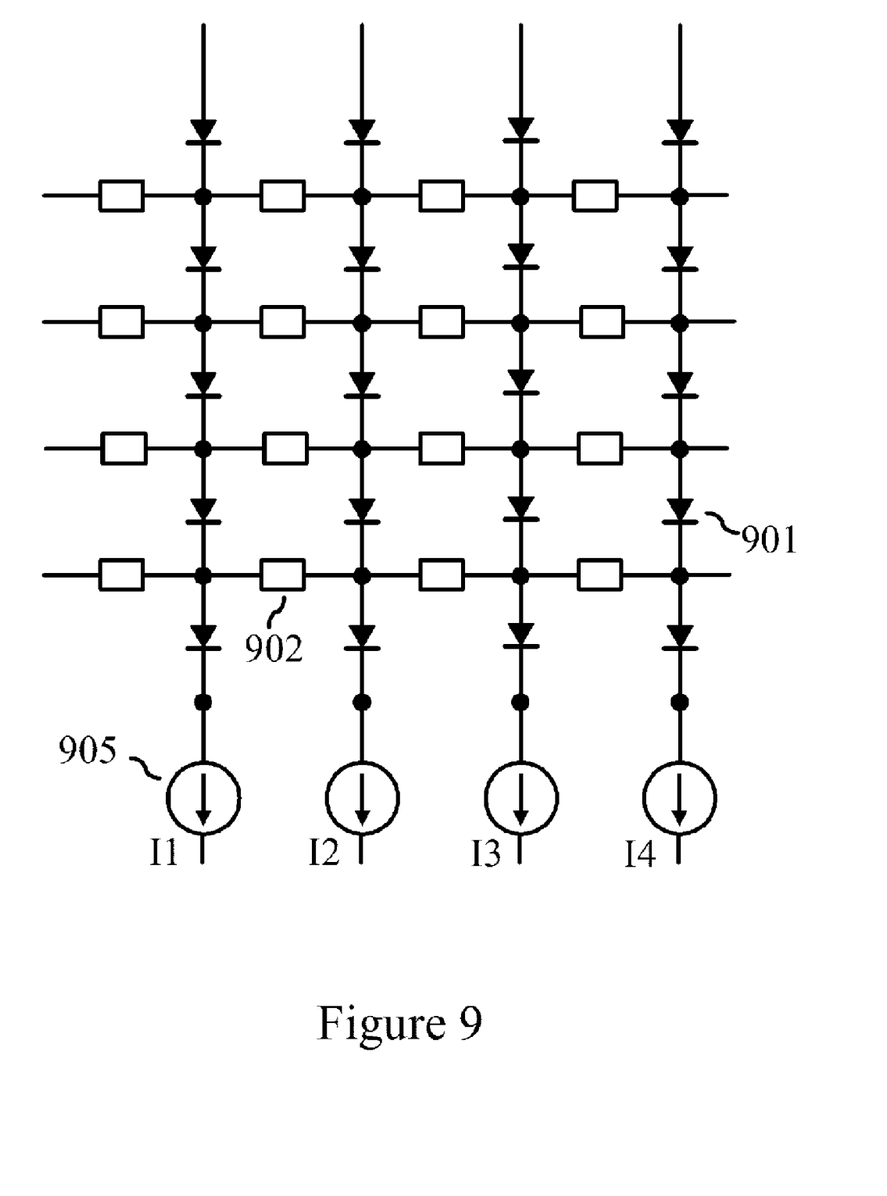
FIG. 9 is a schematic of a preferred embodiment of light emitting device array of the present invention.

FIG. 9 provides a preferred embodiment of the present invention in a full matrix implementation. The full matrix implementation is an extension of the three-cluster version of FIG. 7. Each LED cluster comprises at least an LED of the same type. Such LED in a cluster is connected to the same type LEDs in the two adjacent cluster, each connection is made in the same manner as fro the embodiment of FIG. 6.

The last cluster in the matrix then is connected to the preceding (second to the last) cluster, and to the first cluster, forming a cyclic connection. The analysis of preferred operation, and the preferred implementation using diac as the voltage control device are similar to that of FIG. 6 and FIG. 7.

Figure 10:
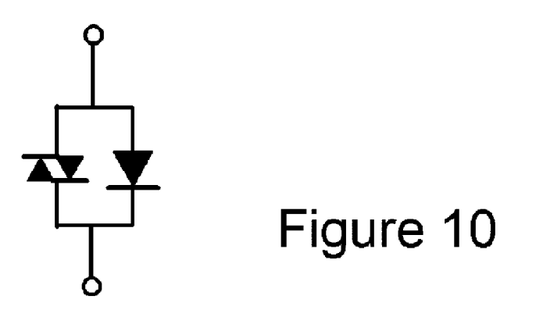
FIG. 10 is a preferred embodiment of a light emitting device element of the present invention.

FIG. 10 provides another preferred embodiment of a specific unit device combination for constructing the present invention, wherein a light emitting device is packaged or integrated with a diac in a parallel connection forming a two-terminal device. The diac in this embodiment requires a specific characteristic to perform the desired operation of this invention. The breakover voltage of such diac is designed to be between 1 to 20 volts higher than the onset voltage of the LED of FIG. 10. A desirable range of such diac is between 2 to 6 volts above the LED onset voltage, or 5.5 to 9.5 volts for an LED with a 3.5V onset voltage.

Figure 11:
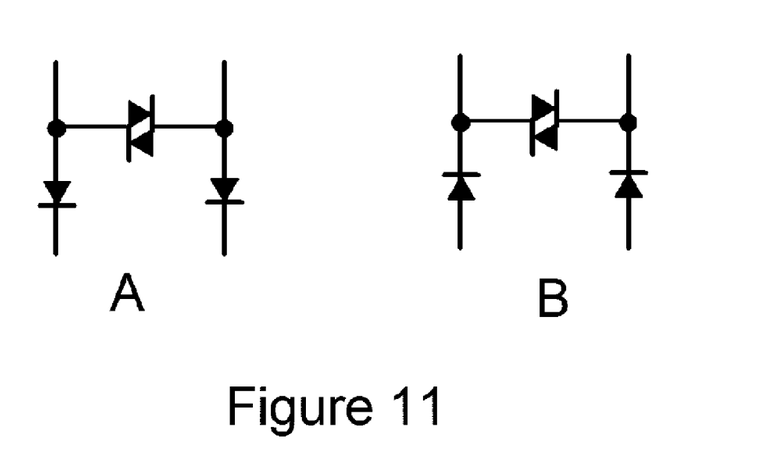
FIG. 11 provides preferred embodiments of light emitting device elements of the present invention.

FIG. 11 provides another preferred embodiment of a specific device combination for constructing the present invention, wherein two LEDs of the same type and one diac-like device are forming a unit element, wherein one end of each LEDs, either two anodes or two cathodes, are connected via the diac. The diac in this unit element has a specific characteristics to perform the desired operation. The diac or diac-like device has a breakover voltage between 0.5V and twice the onset voltage of the LEDs. The breakover voltage should be kept low to avoid excessive voltage developed across the diac in the event a LED becomes open circuit. A breakover voltage also needs to be above a level so not to re-distribute current laterally during a normal operation where all LEDs are in normal condition. A preferred condition for the diac or diac-like device in this unit is a breakover voltage that is 2 and 6 volts above the onset voltage of the LEDs. For a LED operates between 3.5V and 5V, a favorable breakover voltage is between 5.5V and 9.5V.

Figure 12:
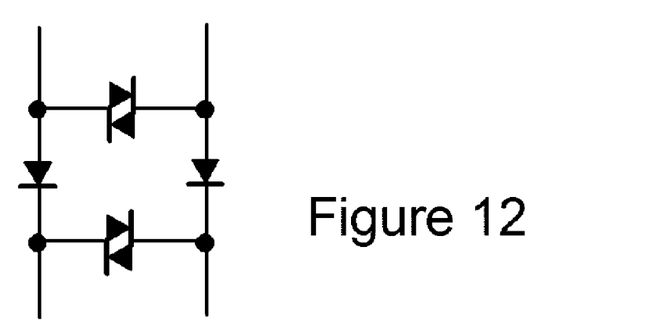
FIG. 12 is a preferred embodiment of a light emitting device element of the present invention.

FIG. 12 provides another preferred embodiment of a specific device combination for constructing the present invention, wherein two LEDs of the same type and two diac-like devices are forming a unit element, wherein the two LEDs are connected anode-to-anode and cathode-to-cathode, each via a diac or diac-like device. The diac in this unit element has a specific characteristics to perform the desired operation. The diac or diac-like device has a breakover voltage between 0.5V and twice the onset voltage of the LEDs. The breakover voltage should be kept low to avoid excessive voltage developed across the diac in the event a LED becomes open circuit. A breakover voltage also needs to be above a level so the current drive is not re-distributed laterally during a normal operation where all LEDs are in normal condition. A preferred condition for the diac or diac-like device in this unit is a breakover voltage 2 to 6 volts above the onset voltage of the LEDs. For a LED operates between 3.5V and 5V, a favorable breakover voltage is between 5.5V and 9.5V.

Figure 13:
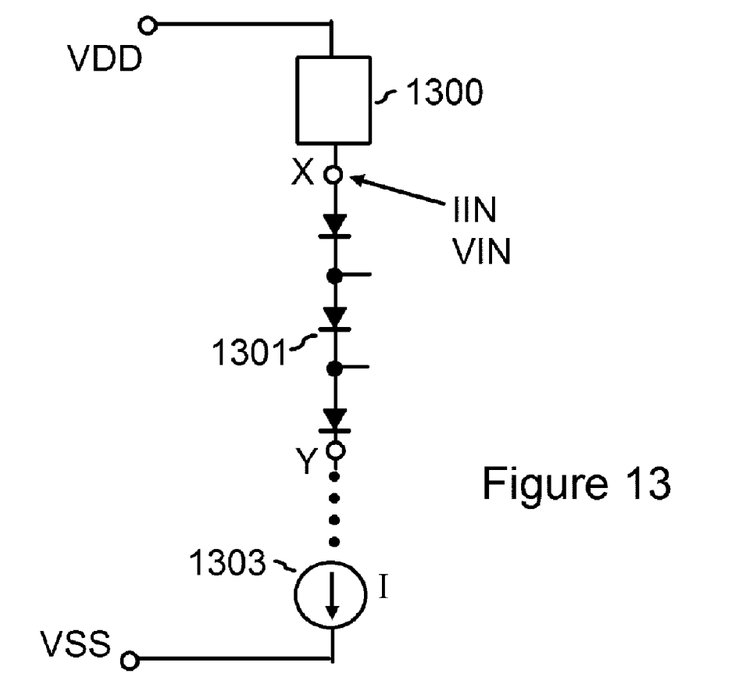
FIG. 13 is a schematic of a preferred embodiment of a light emitting device cluster drive circuit of the present invention.

For driving an LED cluster where lateral current routes are created via voltage control devices, such as the preferred embodiments described in FIGS. 5, 6, 7, and 9, a preferred circuit schematics is provided in FIG. 13 wherein an LED cluster is driven by a current source. One end (Y) of the cluster 1301 is connected to the current driver, and the other end (X) is connected indirectly to a common voltage VDD via a circuit 1300. Both ends X and Y are not connected to any fixed reference voltages. The LED cluster is thus floating on two adjustable voltage levels. This scheme allows the terminal voltage of a LED cluster to adapt to the increased resistance and voltage when a lateral conducting route is created. The adaptive circuit 1300 provides a function to allow a current I, pre-determined by current source 1303, to be directed through, and simultaneously adjust its terminal voltage to bridge the difference in voltage between node X and VDD.

Figure 14:
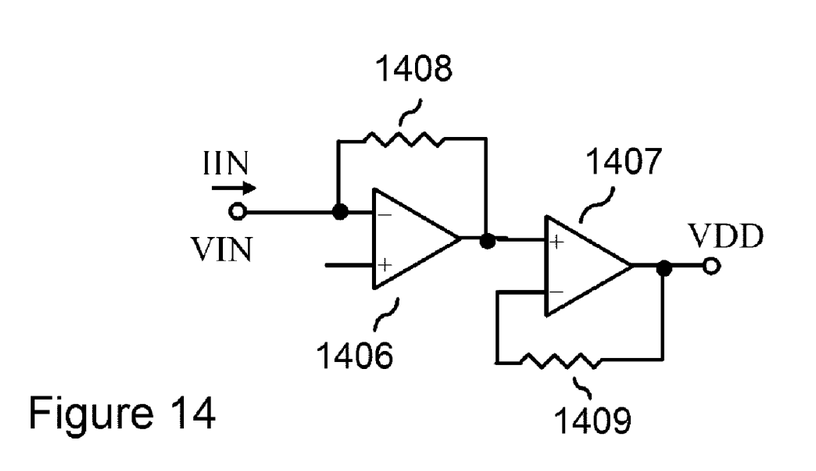
FIG. 14 is a preferred embodiment of a drive circuit in the present invention.

An example of a preferred embodiment of a current-voltage adaptive circuit for 1300 is given in FIG. 14, wherein the output of a first operational amplifier is 1406 is connected to an input end of a second operational amplifier 1407. The drive current I is directed into IIN and sunk into the first operation amplifier via a resistor 1408. The current input IIN, the resistor 1408, and the input voltage VIN determine the output voltage of the first operational amplifier. The second operational amplifier allows the any voltage condition to be satisfied by allowing a current flow via resistor 1409 to adapt to any voltage difference between the outputs of the first and the second operational amplifiers.

Figure 15:
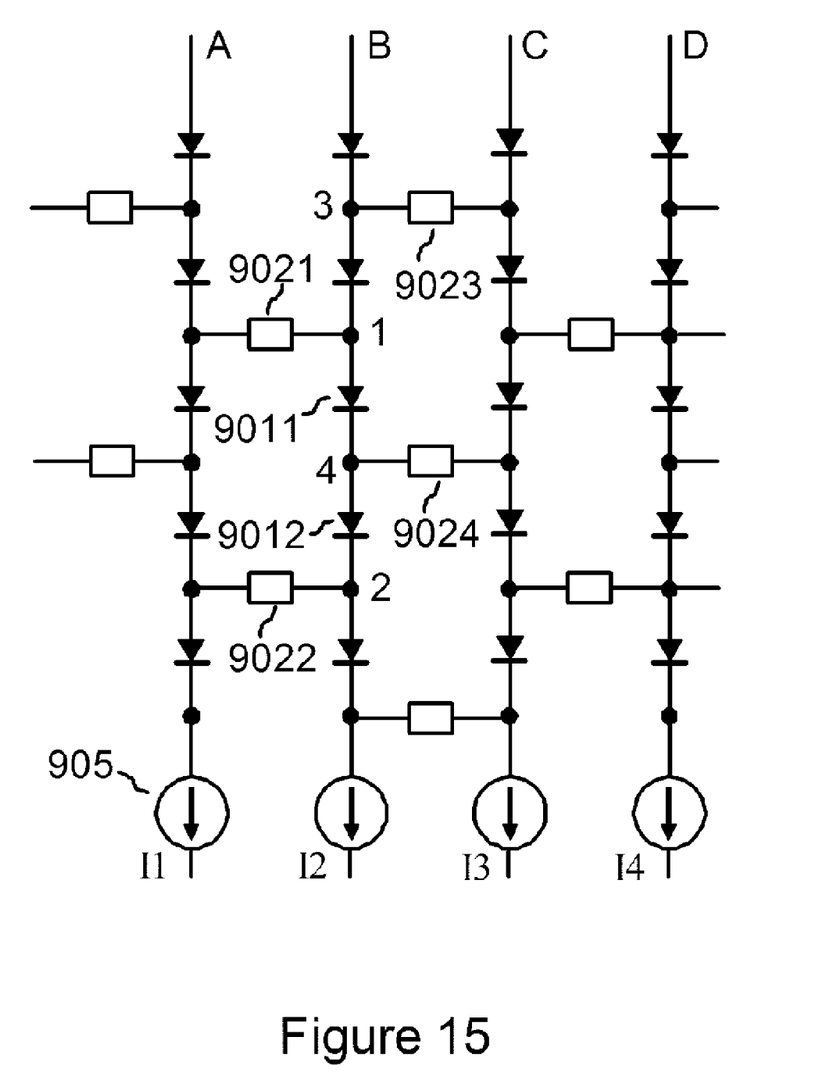
FIG. 15 is a schematic of a preferred embodiment of light emitting device array of the present invention.

FIG. 15 provides another preferred embodiment of the present invention for an array of light emitting devices. Each light emitting device in a cluster has its two terminals connected to the two adjacent clusters alternately: the first end of the light emitting device 9011 of cluster B is connected to a node in cluster A via a voltage control device 9021, and the second end of the light emitting device 9011 of cluster B is connected to a node in cluster C via a voltage control device 9024. The succeeding light emitting device in cluster B, 9012, has its first end connected cluster C, and its second end connected to a node in cluster A, and so on.

In a preferred operation, in current sources I1, I2, I3 are used to direct pre-determined current to cluster A, B, and C, respectively. In the event that one light emitting device, 9011 for example, become open circuit, current continuity requires that part of the current I2 be re-directed to cluster a at node 1. The voltage drop across the voltage control device 9021 rises until it is turned on and the continuity condition is met. This diverted current returns to cluster B from cluster A at node 2 via another voltage control device 9022. The voltage across 9022 responds similarly to that in 9021. Another current diversion occurs at node 3. Due to the symmetry, an amount of current similar to that into cluster A at node 1 is diverted at node 3 to cluster C via a voltage control device 9023, and merges back into cluster B at node 4 via a voltage control device 9024. The two current diversions are symmetrical, and nearly equal amount of current diversion is reasonably expected. Regardless of the actual amount of each of the component of current diversion to cluster A and C, the total current increases in the two light emitting devices in cluster A along the diversion path from node 1 to 2, and similar two light emitting devices in cluster C, are equal to the current I2. Since there are two light emitting devices on each path, the total increase of light output from these four light emitting devices are twice that of the original light output from 9011. At the same time, the succeeding light emitting device 9012 conducts less current than 12, as only one component (~½) of the current diversion returns to cluster B at node 4 from cluster C. The current in the light emitting device preceding 9011 is similarly reduced as the diverted current component going into cluster C has left cluster B at node 3. The total reduction in light output due to the current reduction in the LEDs preceding and succeeding 9011 is thus equal to one times the original light output from 9011. The net light compensation is thus 2−1=1, equal to unity. The light loss is thus 100% compensated in this structure.

Various light emitting devices may be incorporated in the present invention to form an array of display elements or light source, such as that used for LCD backlight or matrix LED display. Examples of such light emitting devices include such structures and materials as silicon or GaN LEDs, or white phosphor LEDs. Such light emitting devices and systems may readily adopt the principles and methods of the present invention, or to include the circuit directly derived from this invention. Such combinations are conceivably within the scope of the present invention, and the present invention embraces all such applications. It is also conceivable that various types of materials may be used to construct elements for the circuit, and all such variations are embraced by the present invention.

For example, a linking circuit connecting two LEDs in two LED clusters, having a transfer characteristics similar to that of a voltage control device or a diac described hereinabove, is conceivably within the scope of the present invention. As another example, for those skilled in the art, it is conceivable that integrating a diac-like device with an LED into a single monolithic circuit is also well within the teaching of the present invention.

Although various embodiments utilizing the principles of the present invention have been shown and described in detail herein, those skilled in the art can readily devise many other variances, modifications, and extensions that still incorporate the principles disclosed in the present invention. The scope of the present invention embraces all such variances, and shall not be construed as limited by the number of active elements, wiring options of such, or the polarity of a light emitting device therein.

What is claimed is:

1. An apparatus comprising
   a plurality of light emitting elements grouped in at least a string and connected in series;
   wherein each said light emitting element comprising a first end and a second end;
   each of said light emitting element operating to emit light at or above a first onset voltage by conducting an electrical current;
   wherein said apparatus further comprises at least a voltage control device; wherein said voltage control device operates in a low impedance state or a high impedance state according to the terminal voltage difference between said first end and second end of at least one said light emitting element; wherein said voltage control device operates in the high impedance state when said voltage difference is between zero and a first breakover voltage, and operates in the low impedance state when said terminal voltage difference reaches or exceeds said first breakover voltage;
   wherein said voltage control device conducts negligible amount of current in said high impedance state compared to the current in said light emitting element; and
   wherein said voltage control device provides at least a current path parallel to at least said light emitting device when in its low impedance state.

2. The apparatus according to claim 1 wherein said voltage control device provides a current path via its first and second ends, said voltage control device being connected to at least a said light emitting device, first end to first end, and second end to second end.

3. The display apparatus according to claim 1, wherein said light emitting elements operates between said first onset voltage and a first upper bound voltage;
   wherein said first breakover voltage of said voltage control device is higher than said first upper bound voltage of said light emitting elements.

4. The display apparatus according to claim 3, wherein said breakover voltage of said voltage control device is 0.5 to 10 volts higher than said upper bound voltage for operating said light emitting elements.

5. The display apparatus according to claim 3, wherein said first upper bound voltage is 0.5 to 5 volts higher than said first onset voltage of said light emitting elements.

6. The display apparatus according to claim 1, wherein said voltage control device operates with a current-voltage relation resembles that of a diac comprising silicon regions of p-n-p-n or n-p-n-n.

7. The display apparatus according to claim 1, wherein said string of light emitting elements is connected to a current source, said current source delivering a predetermined amount of current to said string of light emitting elements.

8. An apparatus comprising
a plurality of light emitting elements each comprising a first end and a second end;
each of said light emitting element operating to emit light at or above a first onset voltage by conducting an electrical current;
wherein said apparatus further comprises at least a voltage control devices; wherein said voltage control device operates in a low impedance state or in a high impedance state according to the terminal voltage difference between the first end of a first said light emitting device and the first end of a second said light emitting device;
wherein said voltage control device operates in a high impedance state when said terminal voltage difference is between zero and a first breakover voltage, and operates in a low impedance state when said terminal voltage reaches or exceeds said first breakover voltage;
wherein said voltage control device conducts negligible amount of current in said high impedance state compared to the current in said light emitting element; and
wherein said voltage control device provides at least a current path across said two light emitting devices when in its low impedance state.

9. The apparatus according to claim 8 wherein said first end of said first light emitting device and said first end of said second light emitting device are connected via said voltage control device.

10. The apparatus according to claim 8 wherein said breakover voltage is a fraction of said onset voltage.

11. The display according to claim 8, wherein said breakover voltage is 0.5 to 15 volts higher than said first onset voltage.

12. The display according to claim 8, wherein the resistance between said first end and second end of said voltage control circuit decreases when the voltage between said first end and second end of said voltage control circuit reaches over said breakover voltage from below.

13. The apparatus according to claim 8 wherein said voltage control device comprising a short circuit loop thereby providing conducting path at any voltage difference.

14. The apparatus according to claim 8 wherein said voltage control device comprises two ends, and wherein said voltage control device operates in a high impedance state when the voltage difference between said two ends of the voltage control device is between zero and a first breakover voltage, and operates in a low impedance state when the voltage difference between said two ends reaches or exceeds said first breakover voltage.

15. The apparatus according to claim 8 wherein said plurality of light emitting devices are arranged in clusters each comprising a serial string of light emitting devices, and wherein said first light emitting device and said second light emitting device are elements from two separate clusters.

16. The display apparatus according to claim 15, wherein each said cluster is connected to a current source; each said current source directing a current to the cluster connected thereto according to a control signal.

17. The apparatus according to claim 8 further comprising a second voltage control device; wherein said voltage control device operates in a low impedance state or in a high impedance state according to the terminal voltage difference between the second end of a first said light emitting device and the second end of a second said light emitting device; and
wherein said voltage control device operates in a high impedance state when said terminal voltage difference is between zero and a first breakover voltage, and operates in a low impedance state when said terminal voltage reaches or exceeds said breakover voltage.

18. The apparatus according to claim 8 further comprising a second and a third voltage control devices, at least a third light emitting device;
wherein said second voltage control device operates in a low impedance state or in a high impedance state according to the terminal voltage difference between said first end of said second light emitting device and said first end of said third light emitting device;
wherein said third voltage control device operates in a low impedance state or in a high impedance state according to the terminal voltage difference between said first end of said third light emitting device and said first end of said first light emitting device;
wherein each said voltage control device operates in a high impedance state when said terminal voltage difference is between zero and a first breakover voltage, and operates in a low impedance state when said terminal voltage reaches or exceeds said breakover voltage;
and wherein each said voltage control devices, when in its low impedance state, provides at least a current path across said two controlling light emitting devices.

19. The apparatus according to claim 18 wherein said first end of said second light emitting device and said first end of said third light emitting device are connected via said second voltage control device; wherein said first end of said third light emitting device and said first end of said first light emitting device are connected via said third voltage control device.

20. The apparatus according to claim 19 further comprising at a plurality of voltage control devices, wherein each pair of the second ends of said first, second, and third light emitting device is connected via a voltage control device; wherein said voltage control device operates in a high impedance state when its terminal voltage difference is between zero and a first breakover voltage, and in a low impedance state when said terminal voltage reaches or exceeds a breakover voltage.

21. The display according to claim 8, wherein the voltage control device has a characteristic emulating a diac at breakover voltage.

22. The apparatus according to claim 8 further comprising a plurality of voltage control devices, and wherein said plurality of light emitting devices are arranged as multiple clusters;
wherein each said voltage control device operates in a low impedance state or in a high impedance state according to the terminal voltage difference between the first end of a light emitting device in one cluster and the first end of a light emitting device in another cluster;
wherein said voltage control device operates in a high impedance state when said terminal voltage difference is between zero and a first breakover voltage, and operates in a low impedance state when said terminal voltage reaches or exceeds said first breakover voltage;
and wherein said voltage control device, when in its low impedance state, provides at least a current path across two clusters.

23. The apparatus according to claim 8 further comprising a plurality of voltage control devices, and wherein said plurality of light emitting devices are arranged as multiple clusters;
- wherein a set of three light emitting devices connected in succession in a first cluster are connected to a similar set of three light emitting devices in a second cluster and to a similar set of three light emitting devices in a third cluster, according to the following connection:
- the first end of the first light emitting device in said first cluster is connected to the first end of the first light emitting device in said second cluster via a said voltage control device;
- wherein the second end of the first light emitting device in said first cluster is connected to the second end of the first light emitting device in the third cluster via a said voltage control device;
- the first end of the third light emitting device in said first cluster is connected to the first end of the third light emitting device in said second cluster via a said voltage control device;
- and wherein the second end of the third light emitting device in said first cluster is connected to the second end of the third light emitting device in said third cluster via a said voltage control device.

24. The apparatus according to claim 8 wherein said plurality of light emitting devices are arranged as at least a cluster, said cluster comprising a plurality of said light emitting devices connected in series therein;
- wherein one end of said cluster is further connected to an adaptive circuit; wherein said adaptive circuit connects to a voltage reference;
- wherein said adaptive circuit provides an input terminal to receive an input current; and
- wherein said input terminal of said adaptive circuit receives an input voltage simultaneously with said current.

* * * * *

UNITED STATES PATENT AND TRADEMARK OFFICE
CERTIFICATE OF CORRECTION

| | | |
|---|---|---|
| PATENT NO. | : 7,629,751 B2 | Page 1 of 1 |
| APPLICATION NO. | : 11/681781 | |
| DATED | : December 8, 2009 | |
| INVENTOR(S) | : Chou | |

It is certified that error appears in the above-identified patent and that said Letters Patent is hereby corrected as shown below:

Title Page, Item (12) delete "Chou et al." and insert --Chou--.

Title Page, Item (76) Inventors:

should read

--(76) Inventor: Chen-Jean Chou, New City, NY (US)--.

Signed and Sealed this
Twenty-ninth Day of September, 2015

Michelle K. Lee
*Director of the United States Patent and Trademark Office*